No. 745,386. PATENTED DEC. 1, 1903.
A. E. REYNOLDS.
FRICTION BRAKE.
APPLICATION FILED JULY 27, 1903.
NO MODEL. 3 SHEETS—SHEET 1.

WITNESSES
Claude Carey
Beatrice Barlow

INVENTOR
Aldo E. Reynolds,
By L. M. Thurlow
ATTY.

No. 745,386. PATENTED DEC. 1, 1903.
A. E. REYNOLDS.
FRICTION BRAKE.
APPLICATION FILED JULY 27, 1903.
NO MODEL. 3 SHEETS—SHEET 2.

WITNESSES
INVENTOR
Aldo E. Reynolds,
By L. W. Thurlow,
Att'y.

No. 745,386. PATENTED DEC. 1, 1903.
A. E. REYNOLDS.
FRICTION BRAKE.
APPLICATION FILED JULY 27, 1903.
NO MODEL. 3 SHEETS—SHEET 3.

WITNESSES
Claude Carey
Beatrice Barlow

INVENTOR
Aldo E. Reynolds,
By L. M. Thurlow
ATTY.

No. 745,386. Patented December 1, 1903.

UNITED STATES PATENT OFFICE.

ALDO E. REYNOLDS, OF PEORIA, ILLINOIS, ASSIGNOR OF ONE-HALF TO ANDREW O'NEILL, OF PEORIA, ILLINOIS.

FRICTION-BRAKE.

SPECIFICATION forming part of Letters Patent No. 745,386, dated December 1, 1903.

Application filed July 27, 1903. Serial No. 167,099. (No model.)

*To all whom it may concern:*

Be it known that I, ALDO E. REYNOLDS, a citizen of the United States, residing at Peoria, in the county of Peoria, and State of Illinois, have invented certain new and useful Improvements in Friction-Brakes; and I do hereby declare that the following is a full, clear, and exact description of the invention, which will enable others skilled in the art to which it appertains to make and use the same.

This invention pertains to improvements in brakes for street-cars and other classes of rolling-stock.

One of the objects of my present invention is to construct a simple brake for cars that can be operated with a minimum of power.

Another and important object is to provide a brake that will absolutely prevent the sliding of the wheels on the track, but bring the car to a stop in the shortest possible time.

Figure 1:
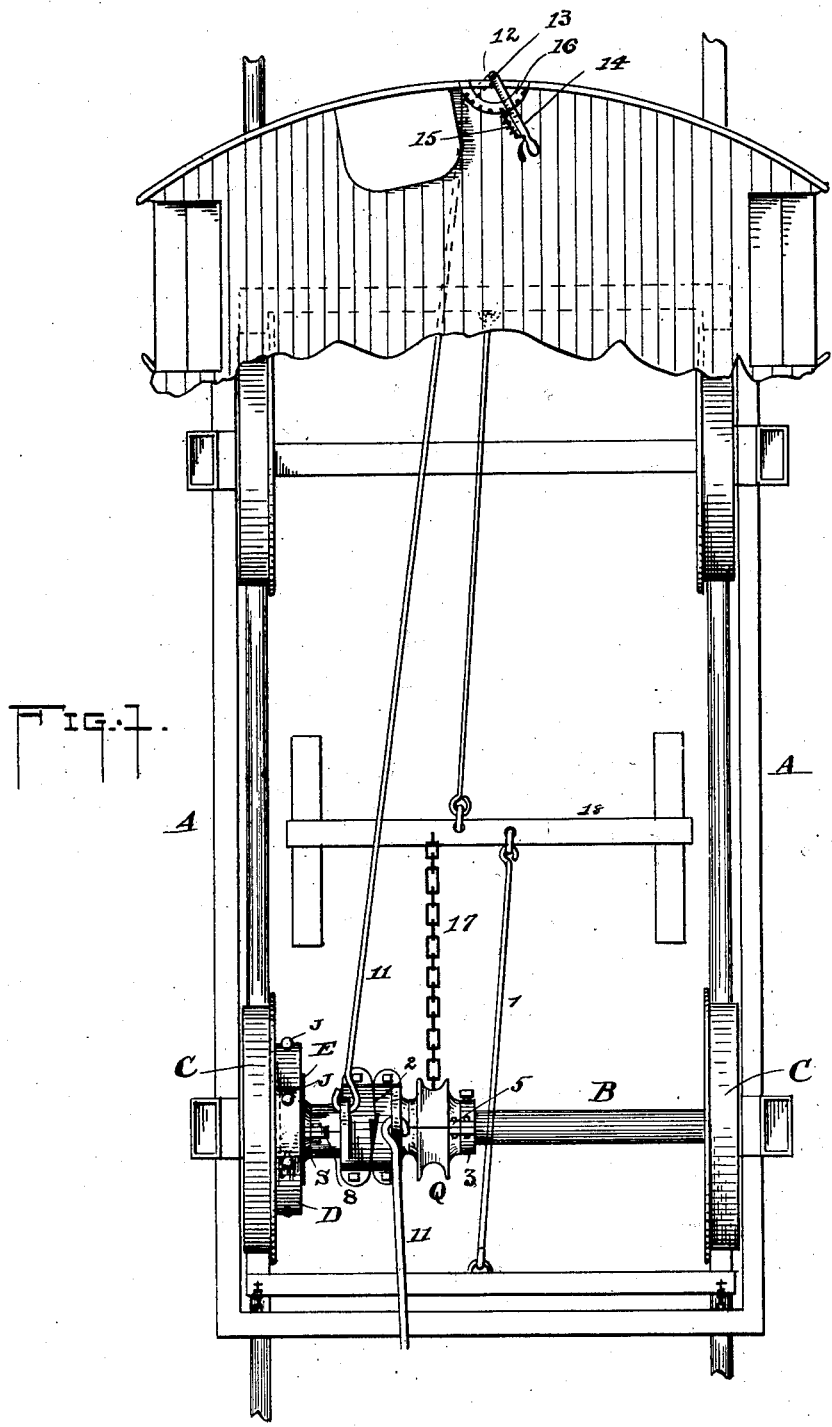
Figure 2:
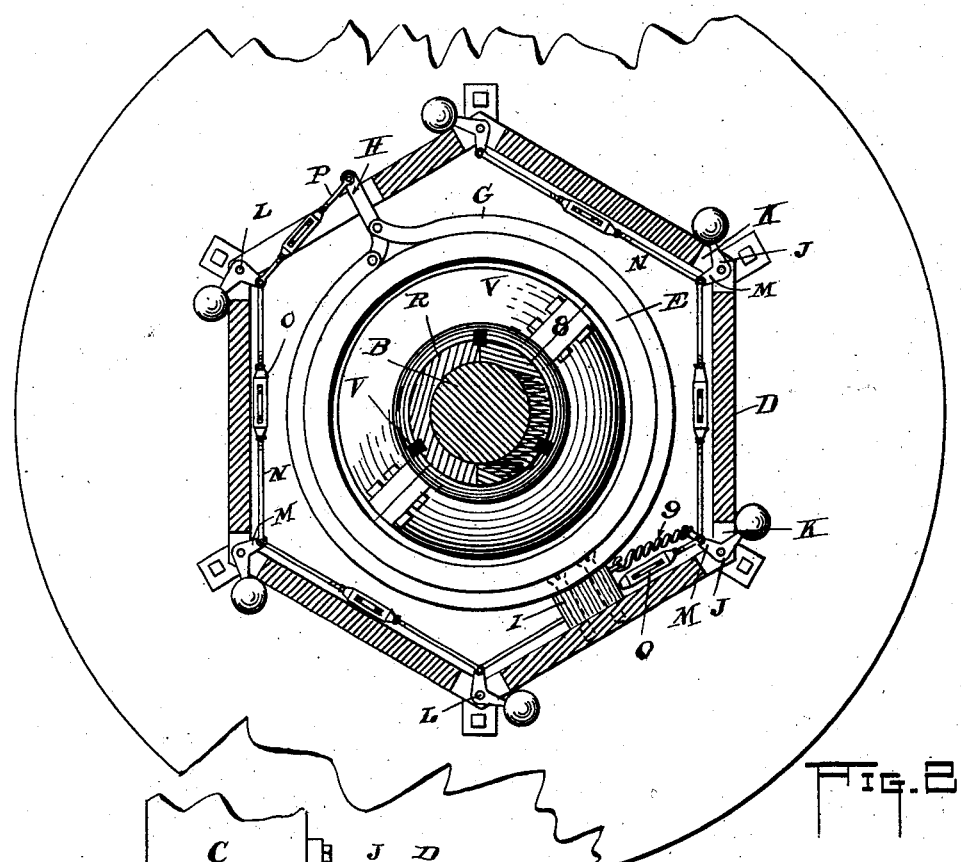
Figure 3:
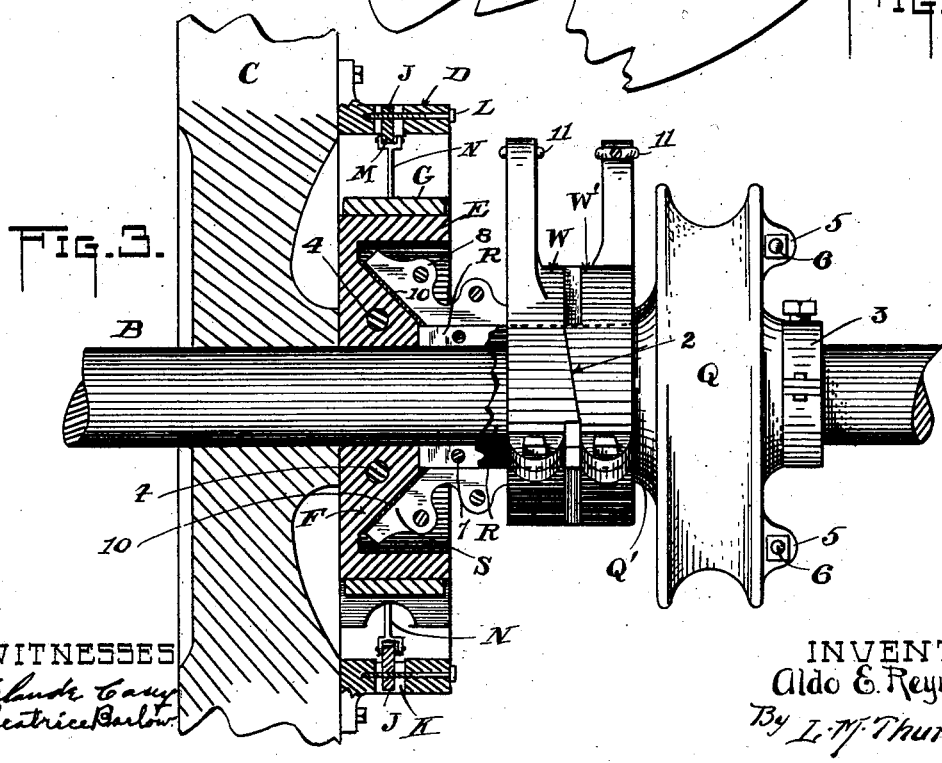
Figure 4:
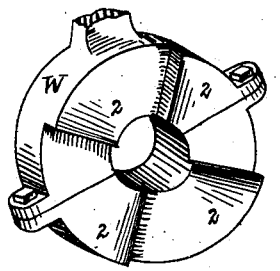
Figure 9:
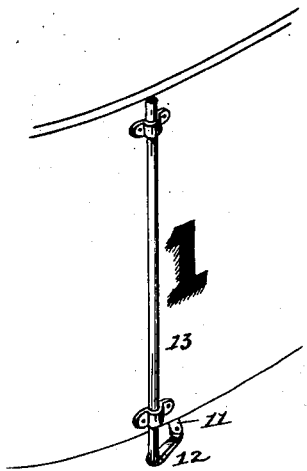
Figure 5:
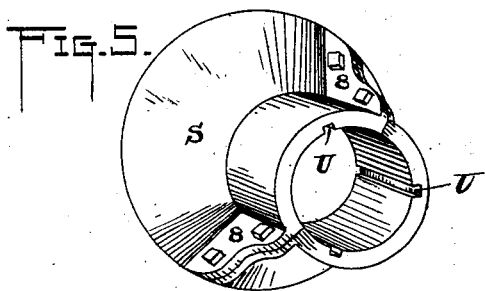
Figure 6:
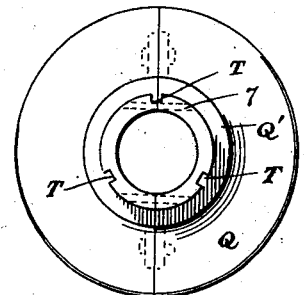
Figure 7:
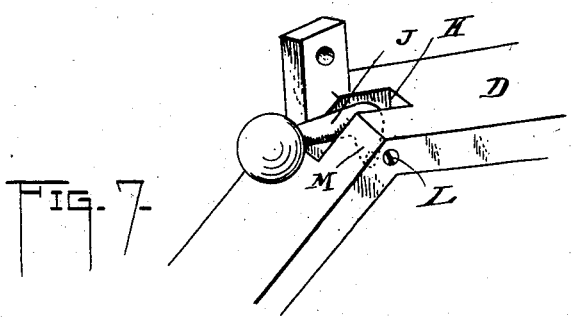
Figure 10:
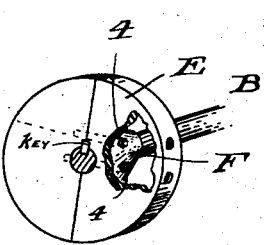
Figure 8:
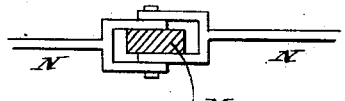

In the accompanying drawings, Figure 1 is a plan view of the trucks of a car, showing my improved brake device applied to one of the car-axles. Fig. 2 is a cross-section of the car-axle, showing one of the wheels and also showing my brake device. Fig. 3 is a cross-section of the car-wheel and portions of the brake device. Fig. 4 is a perspective view of a beveled plate used for shifting a friction-cone. Fig. 5 is a perspective view of a friction-cone. Fig. 6 is an end view of a sleeve and chain-drum. Fig. 7 is a perspective view of a portion of a rim of hexagon form bolted to the car-wheel, showing a weighted lever pivoted therein. Fig. 8 is a cross-section of a portion of the lever shown in Fig. 7, illustrating the manner of attaching forked rods thereto used in operating certain portions of the brake mechanism. Fig. 9 is a perspective view of the dashboard of a car, showing a brake-setting rod and its parts. Fig. 10 is a perspective view of a combined band-wheel and cone showing, the axle of the car to which it is secured.

In Fig. 1, A indicates the gear-frame of car, B the axles of the car, journaled in said frame, and C the wheels secured to the axles in the ordinary manner. Either cast with or secured to one of the wheels C in any suitable manner is a rim D, which may be circular in form or any other desired shape—as, for instance, a hexagon, as shown in the drawings. Within this rim, loose on the axle B, is a band-wheel E, whose interior is made in the shape of a cone, as at F, the said coned portion being bored out to pass over the said axle and upon which it is allowed to turn, as hereinafter described. Frictionally engaging the outer periphery of the wheel E is a band G, whose adjacent ends are pivotally connected to a lever H, Fig. 2, said band being held stationary at the opposite side of the axle on a block I, which is bolted to or cast with said rim D. It will be seen that by a movement of the said lever H to the left as viewed in Fig. 2 the band G will be tightened upon the wheel E. The said lever and band are operated automatically by means of a series of weighted arms or levers J, pivoted in slots K in the rim D. The manner of pivoting these levers is shown in Fig. 3, in which bolts or pins L are inserted in the rim and pass through the levers, although other means can of course be used. The levers are provided with right-angled projections M, between each of which and pivoted thereto is a rod N, adjustable for length by means of a turnbuckle O. It will be observed that the levers are all connected together in series by said rods and that a rod P, similar to N, connects the lever H with the last lever J of the series, said rod being also adjustable. Thus connected a revolution of the car-wheel will also revolve the levers J with it, resulting in the weights of said levers being thrown outward by centrifugal force and resulting in moving the rods N and P in the direction of their lengths to move the lever H and bind the band G upon the wheel E, the purpose of which will presently appear. Mounted loosely upon the axle B is a chain-drum Q, having a sleeve R, extending toward and abutting against the hub of the coned wheel E F described. Placed upon said sleeve R is a cupped cone S, adapted to fit over the cone F, said cone S being slidable on the sleeve, but held against turning on it by means of keyways T in the sleeve and U in the sleeve of the cone S, keys V serving to accomplish the desired end. Also surrounding the sleeve R are two plates W and W', located side by side and facing one another. The adjacent surfaces of these plates are provided with beveled faces 2, as shown in Fig. 4, where but one of the said plates is shown. Said beveled faces are oppositely placed, so that one fits the other, as shown in Fig. 3, and it will be seen that by rotating one or the other upon the sleeve R the plate W will be forced toward the cone F. This results by reason of the plate W' being held from movement along the sleeve by contacting with a shoulder Q' of said chain-drum Q, this latter being also held from movement on the axle by means of a collar 3, suitably secured to said axle. The sleeve of the cone S is adapted at all times to bear against the plate W, so that a movement of the latter will shift the cone toward the cone F, as will be understood. Since the wheels C are forced on or shrunk on their axles, a construction must be employed by which to secure the various parts upon the axle, and to this end the said parts are made in halves, so that they may be clamped together about the axle or upon the sleeve R. The wheel E F is held together by means of bolts or screws 4, passing through the solid portion of the cone, as indicated in Fig. 3. The chain-wheel Q is held by means of ears 5 and bolts 6, while the sleeve end thereof is held by screws 7, Figs. 3 and 6, much the same as the wheel E F. The cone S, as shown in Fig. 5, is divided and held by ears 8, while the plates W and W' are similarly provided, as shown in Figs. 3 and 4. If the rim D is to be secured to the wheel C, it must also be made in halves in order to get around the axle.

In the practical use of my improved brake it is impossible to slide the wheels upon the track no matter how tight the cones are set. It is well understood that the efficiency of a brake is lost when it is set so tight that the wheels are dragged upon the track. It is also well understood that if the brake can be set up to that point where the wheels will just turn without slipping the most effective work is being done. With these ideas in view, therefore, it is the intention to provide a brake that will not slide the wheels, but at the same time make the frictional contact up to the very limit, thus stopping the car in the quickest possible time. In accomplishing this I assemble the parts as already described and begin by tightening the rods N and P by means of their turnbuckles, thus drawing the weighted levers J down to the position shown with their weights resting upon the rim D. At the same time the band G is tightened to that extent that the slack is all taken up and the wheel E, which, as before stated, is loose on the axle, is made to turn with the car-wheel. As the car moves faster and faster the balls or weights of the levers J are thrown outward, as already described, and in so doing the band G is tightened more and more. Now if it is desired to apply the brakes one of the plates W and W' is turned or rocked on its axis by the means to be described later, and by so doing the plate W is moved toward the wheel E, thus pushing the cone S against the cone F of wheel E, and since the latter is held by the band G to revolve with the car-wheel the cone S will be made to revolve also, and being keyed to the sleeve R of the chain-drum revolves the said drum to take up the chain to set the brake-shoes on the wheels. Now as the car begins to slow down the levers J, which I shall term "governors," begin to approach the rim D, since the centrifugal force is reduced, and the band G is allowed thereby to slightly relax, thereby permitting the wheel E to slip within it; but the friction between the band and the wheel E is always such that the car is brought to a stand at once, it being understood that the plate W or W' on being set is held in that position until the car stops and then released, as in common practice. When the brakes are set and a stretch of slippery track is reached, the wheels will naturally lock, for the reason that the friction between the band G and wheel E is greater than the traction of the wheel on the rail. The instant that the wheels stop the governors are at once brought down and release the band G to that extent that the wheels again revolve with enough friction between the band G and its wheel E to bring the car to a stop; but as a matter of course more time is necessary in stopping a car on a slippery track than on a dry one. It will be thus seen that the entire device is automatic, the wheels not being permitted to slip for an instant so quick is the change in conditions due to the governors. I have provided a spring 9, Fig. 2, for connecting one of the levers J with the block I for assisting in at once releasing the band G, and several springs may be provided to assist in this operation.

I provide a fiber wearing-surface 10 for the cone S, which assists materially in creating friction between the two cones, and in passing it is desired that it be understood that I may employ any other form of friction arrangement than that shown, as I do not confine myself to any particular form thereof. In Fig. 1 is shown the means of operating the plates W and W'. This consists in connecting with each plate a rod 11, which extends to the end of the car to attach to an arm 12 on the lower end of a vertical shaft 13, which, as shown in Fig. 1, has an arm 14, with a spring-catch 15 for engaging a notched bar 16. By a study of said Fig. 1 it will be seen that by a movement of the arm 14 toward the left the arm 12 on the lower end of the shaft 13 is moved in a direction to pull the rod 11 forward to turn the plate W on its axis to shift the cone S for the purposes described. The plate W' being oppositely arranged, a pull of its rod 11 will accomplish the same result. The chain 17 of the chain-drum Q is attached in the usual manner to a bar 18 of the brake-setting mechanism, and as this is well understood no further description will be necessary at this time. Returning to the plates W and W', these members as I have shown them are each provided with four slanting faces, those of one plate being oppositely arranged to those of the other, so that when moved the said plates will be forced apart. Using this method of shifting friction members is new in so far as I am aware. In most devices of this class it has been customary to construct the chain-drum and friction-cone in one member and shift it along the axle; but this method is impracticable, for the reason that when the brake is set it is almost impossible to shift the friction member and drum after the chain has been tightened sufficiently to accomplish the stopping of the car. In view of this the advantage of my construction will be evident, since when the plates W W' are turned to release the cone S the releasing of the brakes has been accomplished.

If it is desired to eliminate the automatic feature of my improved brake, the wheel E may be secured to the axle and the band G and rim D removed. In this condition the brake may be used with good results.

I do not wish to confine myself to the particular construction shown and described, as many changes may be made without departing from the spirit and intent of the invention.

I claim—

1. In a friction-brake for street-cars a friction-cone carried on the car-axle but free thereof, means for automatically revolving said cone with the axle normally, a shiftable cone for engaging such first cone, a chain-drum carried on the car-axle the same being free to turn on said axle, the said shiftable cone being mounted on the sleeve of said drum to revolve therewith and means for sliding the latter cone along the drum-sleeve to engage the first cone to impart a revoluble movement to the said chain-drum.

2. In a friction-brake for street-cars, a friction-cone carried on the car-axle but free thereof, means for normally revolving said cone with the axle said cone adapted to turn on the axle at times for the purposes set forth, a chain-drum carried on the axle and adapted to revolve thereon, a cone carried with said drum and adapted to shift to engage the first cone and means carried adjacent to said drum for moving said second-described cone toward the first by a rotating motion of such means.

3. In a friction-brake for street-cars, a friction-cone mounted on the car-axle and free to turn thereon but adapted to normally turn with said axle, means for carrying said cone with the axle, a chain-drum carried on the axle the same being free to turn on said axle, a longitudinally-shiftable cone adapted to revolve with the drum and adapted to drive the latter when shifted against the first cone, means carried between the drum and the shiftable cone for moving said cone by a partial rotary movement of such means substantially as set forth.

4. In a friction-brake for street-cars, a friction-wheel carried on the car-axle, a friction device for engaging such wheel for stopping the car and means for shifting said friction device to engage the said wheel consisting of two plates adapted for a partial revoluble movement concentric with the car-axle, one of said plates being held against movement along the axle the other shiftable along said axle by contact with its neighbor, when turned on its axis, to shift said friction device.

5. In a friction-brake for street-cars, a friction-wheel secured to the car-axle to revolve therewith, a chain-drum carried on the said axle but free to turn thereon, a longitudinally-shiftable friction device carried on the hub of the chain-drum to revolve therewith, said friction device adapted to engage with the friction-wheel and means between the drum and the said friction device for shifting the latter by a partial rotating motion of said means concentric with the car-axle.

6. In a friction-brake for street-cars, comprising a friction-wheel secured to the car-axle to revolve therewith, a chain-drum carried on said axle but free to revolve thereon, a longitudinally-shiftable friction device carried on the hub of the drum and secured against rotating on said hub, said hub being secured against movement along the axle and means carried on said hub for shifting the friction device into engagement with the friction-wheel.

7. In a friction-brake for street-cars, a friction-wheel secured on the car-axle to revolve therewith, a chain-drum carried on said axle and free to revolve thereon but held against movement along said axle, a shiftable friction device carried on the hub of the chain-drum for engaging the friction-wheel said device adapted to move along said hub but held from turning thereon and means between said chain-wheel and shifting device for carrying the latter against the friction-wheel, the same consisting of two partially-revoluble members carried on said drum-hub one of them being connected with the operating device at each end of the car, said members having beveled faces adapted to contact with each other to cause separation of such members by a movement of either of them about the hub on which they are carried.

8. In a friction-brake for street-cars, a friction-wheel E F secured on the car-axle, a chain-drum Q carried on the axle and adapted to turn thereon, a friction device S longitudinally shiftable on the hub of the drum but secured from rotating thereon, said drum held against shifting along the axle, and means carried on the drum-hub for shifting the said friction device comprising the plates W and W' to which the operating mechanism at the ends of the car is connected, there being beveled faces on the plates adapted to engage one another to separate the plates and shift the friction device when either plate is rocked substantially as set forth.

9. In a friction-brake for street-cars, a friction-wheel on the car-axle, a shiftable friction device for engaging the same, a chain-drum for operating the brake-shoes resulting from the engagement of the two friction portions, and means for moving the shiftable friction device comprising members one of which is shiftable along the car-axle by a partial revoluble movement of either of such members substantially as set forth.

10. In a friction-brake for street-cars, a friction-wheel carried on the car-axle but free thereof, means for holding said wheel to revolve with the axle normally, a friction device for engaging said friction-wheel, a chain-drum for setting the brakes said friction device being carried on the hub of such drum and secured thereto to revolve said drum such device being shiftable along said hub for the purposes set forth, means for shifting such friction device, and means for holding the friction-wheel tighter as the speed of the car increases such means also releasing said wheel to let the same turn on the axle at the time and in the manner set forth.

11. In a brake for street-cars, a friction-wheel carried on the car-axle the same being free thereof but adapted both to turn with the axle and also turn on it for the purposes described, means for gripping said wheel to carry it with the axle and automatically grip the wheel tighter as the speed of the car increases and also reducing its hold on said wheel as the speed of the car decreases for the purposes set forth, a chain-drum carried on the car-axle but free thereof, a friction device carried on the hub of such drum the same being shiftable along the hub but prevented turning thereon and adapted to turn the drum when in engagement with the friction-wheel and means for shifting the friction device which comprises members having oppositely-beveled faces, the partial rotation of one or the other of such members serving to separate them by the shifting of one of them along the drum-hub substantially as set forth.

12. In a friction-brake for street-cars, a friction-wheel on the axle but free thereof, means for gripping the same to revolve it with the shaft, automatic means for putting greater gripping force on said friction-wheel when the speed of the car increases for the purposes set forth, a chain-drum mounted on the axle but free thereof, a friction device carried on the hub of the said drum, the same being slidable along the said hub but held against turning thereon and adapted to engage with the friction-wheel to drive the drum and set the brakes and means for shifting the friction device into frictional engagement with the said friction-wheel, the automatic gripping device adapted to permit the friction-wheel to slip within it to release the pull of the chain on the car-wheels substantially as set forth.

13. In a friction-brake for street-cars, the car-axle and its wheels, a combined friction cone and wheel carried on the axle, the said cone and wheel being free of the axle, a band-brake surrounding the wheel to hold the latter and revolve it normally with the axle, means carried on the car-wheel operated by centrifugal force in the revolution of the said car-wheel for automatically tightening the band on the friction-wheel, a chain-drum for setting the brakes, and a friction device carried on said drum for engaging the friction-wheel to tighten the brake-chain, the band-brake adapted to partially release the friction-wheel and permit it to turn therein when the frictional members are revolving together and the brake-shoes are all but locked to the wheels as set forth.

14. In a friction-brake for street-cars, the car-axle the friction-wheel E carried loosely on said shaft, the friction-cone F formed with said wheel E, the rim D carried on the car-wheel a series of weighted levers J carried in said rim, a band-brake surrounding the friction-wheel E, connecting means N, P between the band-brake and the said levers J adapted to tighten the band when the weighted levers are thrown outward by the revolution of the car-wheel as described, the chain-wheel Q mounted to turn on the axle, the shifting cone S carried on the hub of the said chain-wheel to turn therewith, and the plates W and W' also carried on the chain-wheel hub the same having beveled faces 2 adapted to contact with one another and separate said plates by a partial revoluble movement of one or the other of said plates to shift the friction-cone S all being arranged substantially as and for the purposes set forth.

15. In a friction-brake for street-cars, the car-axle, the friction wheel and cone E, F loosely mounted on said axle, the band G surrounding said wheel E, the rim D secured to the car-wheel, the weighted levers J pivoted in said rim, the connections N and P connecting the levers with the said band substantially as shown and described and for the purposes set forth, the chain-drum Q loosely mounted on the car-axle, the cone S carried thereon for driving said drum, means for shifting the cone S consisting of the plates W and W' mounted on said drum and adapted for a partial revoluble movement, the same having beveled faces 2 adapted to engage one another to separate said plates as set forth to engage the said cone S with the cone F the latter being revolved by the band G the levers J adapted to cause the band to grip the cone tighter as the car increases in speed and adapted also to release the band when the car decreases its speed for the purposes set forth, and a spring 9 for assisting in moving the levers and releasing said band.

In testimony whereof I affix my signature in presence of two witnesses.

ALDO E. REYNOLDS.

Witnesses:
E. J. ABERSOL,
L. M. THURLOW.